June 9, 1942.  L. H. THOMAS  2,285,543
VEHICLE CONSTRUCTION
Filed Jan. 13, 1941  2 Sheets-Sheet 1

INVENTOR.
LEWIS H. THOMAS
BY
ATTORNEYS

June 9, 1942.  L. H. THOMAS  2,285,543
VEHICLE CONSTRUCTION
Filed Jan. 13, 1941  2 Sheets-Sheet 2
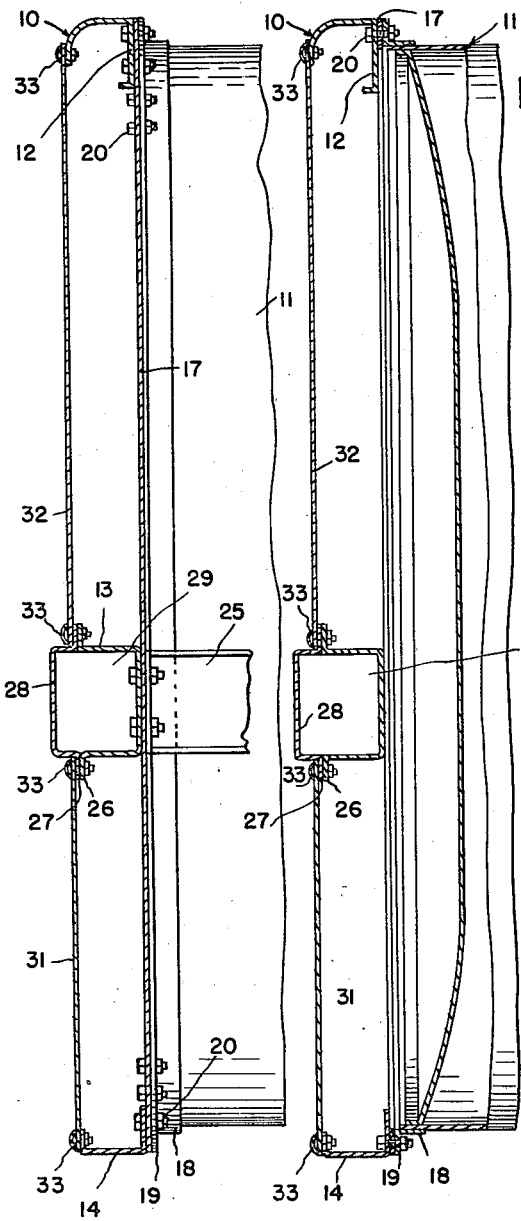
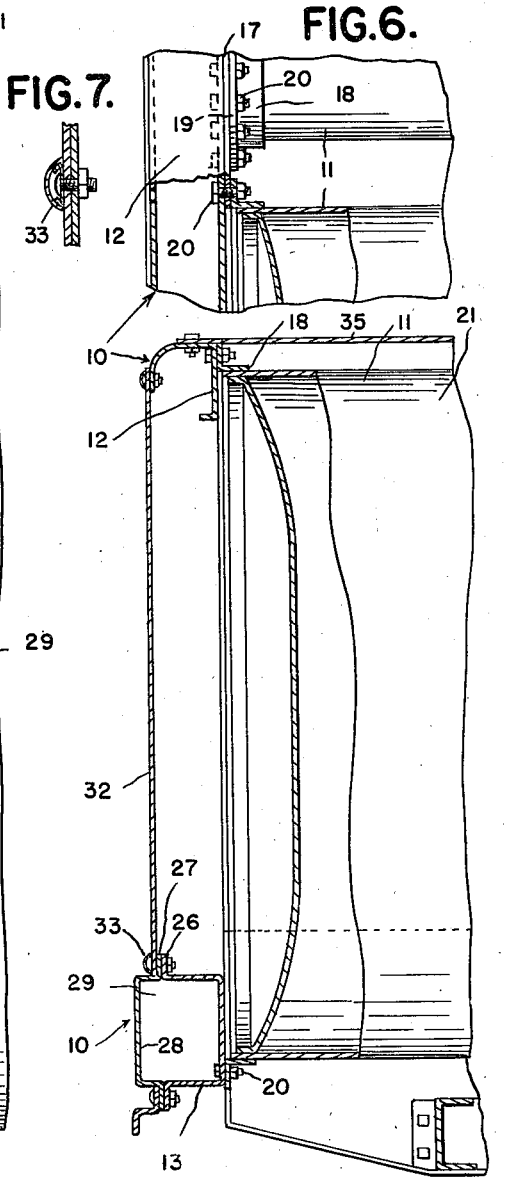
FIG.3.  FIG.4.  FIG.5.
INVENTOR.
LEWIS H. THOMAS
BY
ATTORNEYS Patented June 9, 1942

2,285,543

UNITED STATES PATENT OFFICE 2,285,543

VEHICLE CONSTRUCTION

Lewis H. Thomas, Grosse Pointe, Mich.

Application January 13, 1941, Serial No. 374,294

13 Claims. (Cl. 280—5)

This invention relates generally to vehicles and refers more particularly to improvements in vehicles equipped to transport liquids.

One of the principal objects of this invention is to provide a vehicle having a relatively high pay load to dead weight ratio and at the same time possesses the required strength to comply with all existing regulations.

Another object of this invention is to provide a vehicle having a truss structure at each side for taking the load stresses and having a plurality of individual tanks extending between the trusses with the opposite ends respectively secured to the trusses. The construction is such that the tanks act as spacers between the trusses at opposite sides of the vehicle and impart a certain degree of stiffness to the trusses.

A further feature of this invention is to support the tanks independently of one another in such a manner that one or more of the tanks may be readily removed from the vehicle without disassembling or otherwise interfering with the truss structure. As a result of this feature, if one or more of the tanks become damaged, they may be readily interchanged for tanks in perfect condition, and it is not necessary to take the vehicle out of service until the damaged tank is repaired.

Still another feature of this invention is that the adjacent walls of the juxtapositioned tanks form the equivalent of double bulkheads between the contents of the tanks and, as a result, the safety regulations requiring double bulkheads between mixed loads are complied with without providing special construction.

While the tanks may be of any desirable shape and may be supported by the truss structure in any one of several positions, nevertheless, particularly satisfactory results may be obtained by forming the tanks substantially elliptical in cross section and by supporting the tanks with the major axes of the cross sectional areas thereof substantially vertical to the horizontal plane of the vehicle. As a result of the above, the bottom walls of the tank have a relatively small radius and thereby inherently possess sufficient strength to support the vertical column of liquid in the tanks. In addition to the foregoing, the arcuate opposite side walls of the tanks serve to distribute the surging stresses of the liquid resulting from starting and stopping the vehicle.

A further feature of this invention is to provide a vehicle of the type set forth rendering it possible to panel the sides and back of the vehicle with the minimum additional cost and without the addition of special panel supporting members. As a result, the tanks may be concealed from view and the appearance of the vehicle is thereby greatly enhanced.

A still further feature of the present invention is to provide a truss structure having longitudinally extending structural elements of box cross section capable of being used as a storage space for the unloading hose usually forming a part of the equipment of tank vehicles.

The foregoing as well as other objects will be made more apparent as this description proceeds, especially when considered in connection with the accompanying drawings, wherein.

Figure 1:
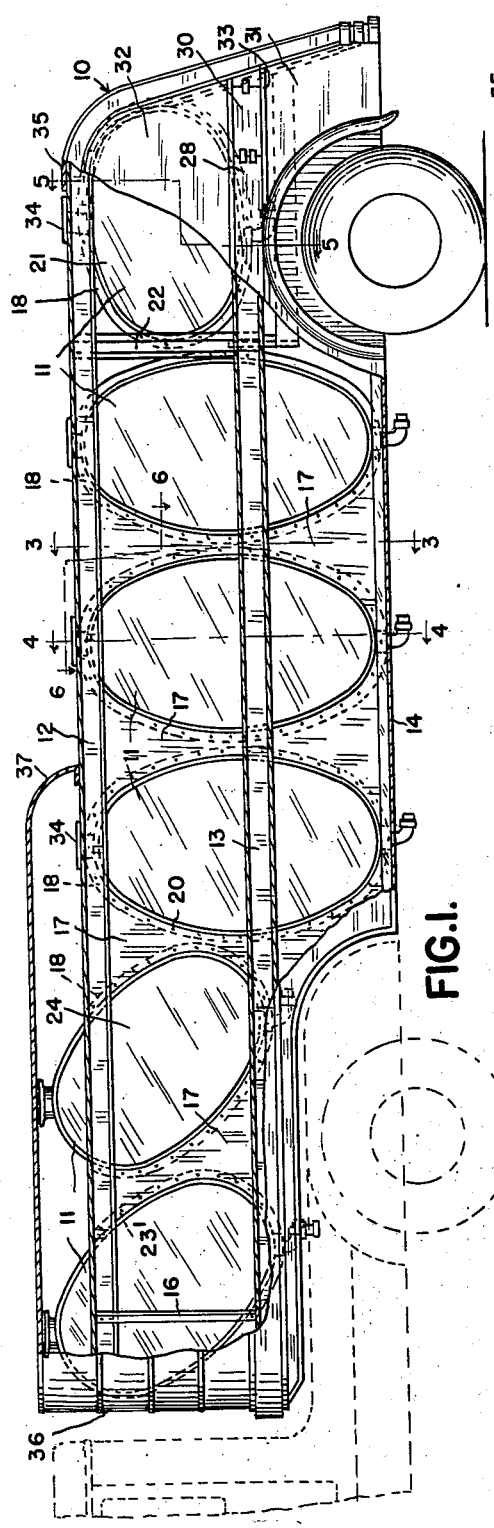
Figure 1 is a side elevation view partly in section of a vehicle constructed in accordance with the present invention.
Figure 2:
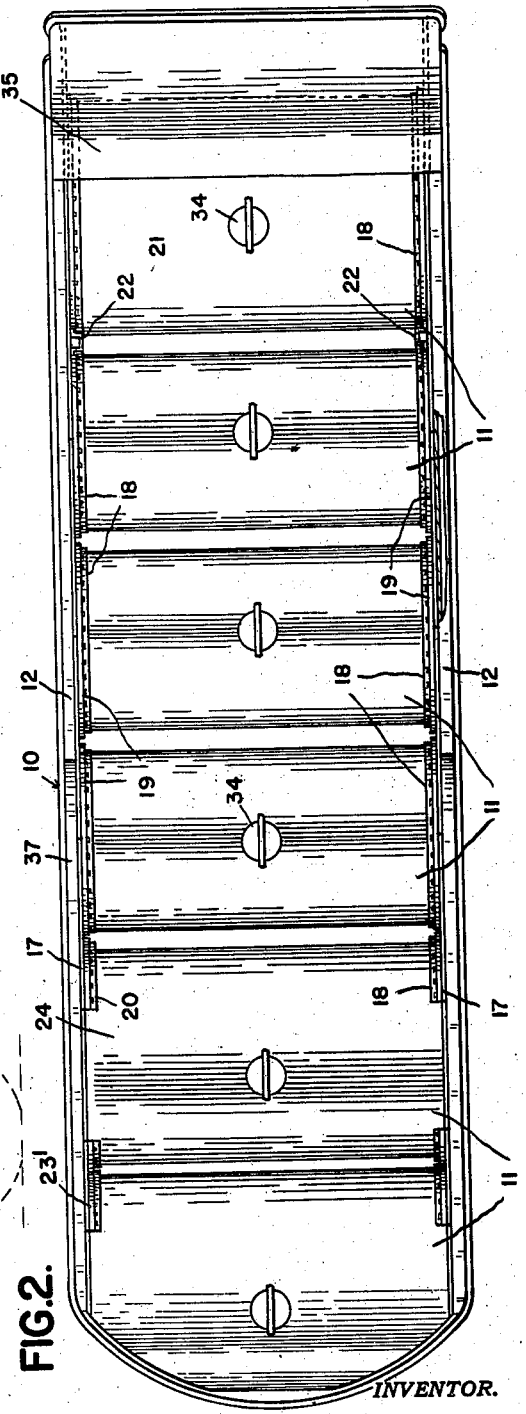
Figure 2 is a plan view of the construction shown in Figure 1.

Figures 3, 4 and 5 are cross sectional views taken respectively on the lines 3—3, 4—4 and 5—5 of Figure 1;

Figure 6 is a sectional view taken on the line 6—6 of Figure 1; and

Figure 7 is a detail sectional view showing one of the molding fastening elements.

Upon reference to Figure 1 of the drawings, it will be noted that my improved vehicle comprises, in general, a truss structure 10 at each side thereof and a plurality of individual tanks 11 suspended from the truss structures. In the present instance, the tanks extend between the truss structures, and the opposite ends of the tanks are respectively detachably secured to the truss structures in a manner to enable one or more of the tanks to be removed from the vehicle without disturbing the trusses.

The number of tanks carried by any one vehicle will, of course, depend to some extent upon the length of the vehicle and upon the arrangement of the tanks on the vehicle. By forming the tanks elliptical in cross section and by arranging the tanks in the manner illustrated in Figure 1, the maximum available pay load space will be utilized. However, many of the advantageous features of this invention are obtainable regardless of the shape of the tanks and the manner in which the latter are arranged on the vehicle. Therefore, it is not my intention to restrict the present invention to any specific arrangement of the tanks on the vehicle or to any particular shape of tank. It may be pointed out, however, that by forming the tanks elliptical in cross section and by suspending the tanks on the vehicle with the major axes of the tanks extending substantially vertically, several advantages are realized. One advantage is that the radius of the bottom walls of the tanks is relatively small and, as a result, adequate support for the vertical column of liquid in the tanks is provided even though the walls of the tanks are of relatively thin gauge metal. Another advantage is that the arcuate opposite side walls of the tanks will afford a better distribution of the surging stresses resulting from acceleration and deceleration of the vehicle.

The truss structure 10 at each side of the vehicle is provided with a plurality of vertically spaced longitudinally extending chord members 12 and 13 secured in proper vertical spaced relationship by web plates 17. As shown in Figure 1, the forward end portions of the top chords 12 are connected to the corresponding end portions of the chords 13 by vertical braces 16, and the rear ends of the chords 12 curve downwardly along the back of the vehicle for attachment to the rear ends of the chords 13. With further reference to Figures 1, 3 and 4, it will be noted that a longitudinal member 14 is spaced below the chord 13 at each side of the vehicle and is connected to the lower portions of the tanks. In the present instance, the members 14 are secured to the chords 12 and 13 by the web plates 17 and thereby form elements of the truss structures 10. However, in some instances the web plates 17 may terminate at the chords 13, in which event, the members 14 are relieved from major load stresses.

The tanks 11 extend transversely of the vehicle between the truss structures 10 and function to space the truss structures laterally from each other. The tanks are suspended from the truss structures, and the opposite ends of the tanks are removably secured to the truss structures in such a manner as to permit any one of the tanks to be readily removed from the vehicle through the top of the latter which is open for this purpose.

In Figure 3 of the drawings, I have illustrated a tank having an annular ring 18 surrounding each end of the tank and secured to the latter. Each ring is provided with a radially extending flange 19 secured at the top to the chords 12 and at the bottom to the structural members 14 by means of bolts or some other suitable readily detachable fastener elements 20. The flanges 19 may also be secured at the sides to the web plates 17 by similar fastener elements, if desired. All of the tanks are preferably attached in the above manner with the exception of the tanks positioned at the extreme ends of the vehicle. The tank 21 at the rear end of the vehicle is supported on its side in order to provide clearance for the rear wheels and associated parts of the vehicle. However, the rear tank 21 is also provided with an annular ring 18 at opposite ends, and the radial flanges of the rings are removably secured at the top to the chords 12 and at the bottom to the chords 13. The rear side of the tank 21 is secured to the downwardly extending portions of the chords 12 and the front side of the tank 21 is secured to vertical braces 22. The braces 22 differ from the webs 17 previously described in that they are in the form of channels having the opposite ends respectively secured to the chords 12 and 13 at each side of the vehicle.

The two tanks at the front end of the vehicle are suspended from the truss structures with the major axes of the elliptical cross sectional areas thereof inclined slightly with respect to the vertical so that the tanks may be accommodated in the minimum storage space. The forewardmost tank 23 is of irregular shape due to the transverse curvature of the front end of the vehicle, and the annular attaching ring 18 previously described is modified so as to extend only partially around the periphery of the tank. The modified attaching rings are indicated in Figure 1 by the reference character 23' and it will be noted that the upper ends of these elements are detachably secured to the chords 12, and the lower end portions of the elements are detachably secured to the chords 13. The portions of the attaching elements between the ends are removably secured to the webs 17 in the same manner as pointed out above. The next adjacent tank 24 is provided with annular attaching rings 18 at opposite ends removably secured at the top to the chords 12 and removably secured at the bottom to the chords 13. The portions of the rings between the points of securement aforesaid are preferably detachably secured to the webs 17.

Although the particular method of suspending the tanks from the truss structures may vary in accordance with different conditions, nevertheless, it will be noted that each tank forms a unit in itself and is capable of being removed from the vehicle through the top of the latter independently of the other tanks. It follows from the above that if one or more of the tanks become damaged, the latter may be removed and interchanged with a tank in perfect condition without taking the vehicle out of service. In addition, it will be noted that the arrangement of the tanks on the vehicle is such that the adjacent walls of the tanks form the equivalent of double bulkheads between the contents of adjacent tanks. This inherent feature of the construction is particularly advantageous in instances where mixed loads are transported since, in such cases, it is essential to provide double bulkheads between the mixed loads in order to comply with existing safety regulations.

It has previously been pointed out that the truss 10 includes the chords 13 which extend longitudinally of the vehicle at opposite sides of the latter. Upon reference to Figure 3, it will be noted that each chord 13 is channel-shaped in cross section and is supported in such a manner that the channel opens outwardly. The side flanges of the channel are formed with laterally outwardly extending attaching flanges 26 and the latter are removably secured to corresponding flanges 27 formed on a cooperating channel-shaped member 28. The channel-shaped members 28 form covers for the chords 13 and are employed as rub rails for the vehicle. It may also be pointed out in connection with the above construction that the enclosed space 29 forms a compartment suitable to house the usual unloading hose (not shown), and when used for this purpose, the cover members 28 are provided with doors 30 preferably at the rear ends thereof rendering the contents of the spaces 29 accessible.

In order to impart a pleasing appearance to the vehicle, the tanks may be concealed by paneling. The paneling at each side of the vehicle comprises a pair of panels 31 and 32. The bottom panel 31 is detachably secured at its lower edge to the structural member 14, and the top edge of the panel 31 is detachably secured to the lower attaching flange 27 on the adjacent cover member 28. The top panel 32 at each side of the vehicle is secured at its lower edge to the upper attaching flange 27 on the associated cover member 28, and the top edge of the panel 32 is detachably secured to the chord 12. It may be pointed out at this time that the detachable securing means for the panels is concealed in each instance by mouldings 33 of any suitable construction. The top of the vehicle is left open so that the tanks may be readily removed or filled through the filler opening 34 provided at the top of each tank. It will be noted that one or more of the tanks may be removed through the top of the vehicle by merely detaching the side panels so as to expose the fastener elements 20.

The rear end of the vehicle is also closed by a panel 35 suitably secured to the downwardly extending rear end portions of the chords 12 and terminating at the top of the vehicle so as not to interfere with removing the tanks. Upon reference to Figure 1, it will be noted that the forward end portion of the vehicle is enclosed by an arcuate panel 36 suitably detachably secured in place, and suitable superstructure 37 may be provided at the forward end of the vehicle to conceal the projecting portions of the tanks 23 and 24.

Thus from the foregoing, it will be observed that I have provided a vehicle which is light in weight due to the fact that the tanks are suspended from the truss structure in such a manner as to be relieved from load stresses and thereby may be formed of thin gauge metal. It will also be noted that the individual tanks are secured to the truss structure by readily detachable securing means in such a manner that one or more of the tanks may be removed from the vehicle through the open top of the latter. In addition, it will be noted that the above construction renders it possible to impart practically any desired appearance to the vehicle without sacrificing pay load and without materially increasing the cost of the construction.

What I claim as my invention is:

1. A vehicle having truss structure at opposite sides thereof and having a plurality of individual tanks extending transversely of the vehicle between the truss structures, and means removably securing opposite ends of the tanks to the truss structure independently of each other and permitting removal of the tanks through the top of the vehicle.

2. In a vehicle, truss structure at opposite sides of the vehicle, a plurality of individual tanks extending between the truss structures, and means for independently and removably suspending the tanks at opposite ends thereof from the truss structures.

3. In a vehicle, truss structure at each side of the vehicle having chord members extending in vertical spaced relation to each other longitudinally of the vehicle, a plurality of individual tanks extending transversely of the vehicle between the chord members at opposite sides of the vehicle, web elements of the truss positioned between the opposite ends of adjacent tanks and secured to the chord members, and means for securing the opposite ends of the tanks to the truss structure at opposite sides of the vehicle.

4. In a vehicle, a truss at each side of the vehicle and each truss having chord members extending in vertical spaced relation to each other longitudinally of the vehicle, a plurality of separate tanks extending transversely of the vehicle between the trusses and removably secured to the chord members independently of each other, and web members secured to the chords of each truss and positioned between adjacent tanks.

5. In a vehicle, a truss at each side of the vehicle and each truss having chord members extending in vertical spaced relation to each other longitudinally of the vehicle, web members connecting the chords at each side of the vehicle, a plurality of separate tanks extending transversely of the vehicle between the trusses, and means detachably securing opposite ends of the tanks to said web members.

6. In a vehicle open at the top, a truss at each side of the vehicle having chord members extending in vertical spaced relation to each other longitudinally of the vehicle, a plurality of separate tanks extending transversely of the vehicle between the chord members at opposite sides of the vehicle and removable through the open top of the vehicle, web members positioned between adjacent tanks at opposite ends of the latter and secured to the chord members, and means readily detachably securing the opposite ends of each tank to said truss structures independently of the remaining tanks.

7. In a vehicle, a truss at each side of the vehicle, a plurality of separate tanks extending transversely of the vehicle between the trusses and having radially outwardly extending flanges at opposite ends thereof, and means for readily detachably securing said flanges to the trusses.

8. In a vehicle, a truss at each side of the vehicle and each truss having chord members extending in vertical spaced relation to each other longitudinally of the vehicle, a plurality of separate tanks extending transversely of the vehicle between the chord members at opposite sides of the vehicle and having radially outwardly extending annular attaching flanges at opposite ends thereof, web members positioned between adjacent tanks at the opposite ends of the latter and secured to the chord members, and means for readily detachably securing the annular flanges on the opposite ends of the tanks to said members.

9. In a vehicle, truss structure at opposite sides of the vehicle, a plurality of individual tanks extending transversely of the vehicle between the truss structures and having the opposite ends suspended from the truss structures, and side panels secured to the truss structure at each side of the vehicle beyond the ends of the tanks for concealing the latter.

10. In a vehicle open at the top, truss structure at opposite sides of the vehicle, side paneling secured to the truss structure at each side of the vehicle, a plurality of individual tanks extending transversely of the vehicle between the side panels and removable from the vehicle through the open top of the latter, and means readily detachably securing opposite ends of the tanks to the truss structures.

11. In a vehicle, truss structure at opposite sides of the vehicle and each truss structure having an outwardly opening channel-shaped chord member extending longitudinally of the vehicle, a cover removably secured to each chord member at the open side of the latter and forming rub rails, and a plurality of separate tanks extending between the truss structures and suspended from the latter.

12. In a vehicle, a truss structure at opposite sides of the vehicle and each truss structure having a chord member of box cross section extending longitudinally of the vehicle, a plurality of tanks extending transversely of the vehicle between the truss structures and suspended from the latter, and means providing access to the interior of one of the chord members whereby the space in the latter may be used as a storage space for an unloading hose, or the like.

13. In a vehicle, truss structure at opposite sides of the vehicle, a plurality of individual tanks located between the truss structures, and removable independently of one another through the top of the vehicle, and means for independently and removably suspending the tanks from the truss structures.

LEWIS H. THOMAS.